United States Patent
Yuasa et al.

[11] Patent Number: 5,143,546
[45] Date of Patent: Sep. 1, 1992

[54] RECORDING MATERIAL

[75] Inventors: Toshiya Yuasa; Kohzoh Arahara, both of Kawasaki; Takashi Kai, Hadano, all of Japan

[73] Assignee: Canon Kabushiki Kaisha, Tokyo, Japan

[21] Appl. No.: 637,208

[22] Filed: Jan. 3, 1991

[30] Foreign Application Priority Data

Jan. 8, 1990 [JP] Japan .................. 2-000406

[51] Int. Cl.$^5$ .............................. C09D 11/02
[52] U.S. Cl. ................................... 106/20
[58] Field of Search ............................. 106/20

[56] References Cited

U.S. PATENT DOCUMENTS

| | | | |
|---|---|---|---|
| 4,409,040 | 10/1983 | Tabayashi et al. | 106/22 |
| 4,838,940 | 6/1989 | Kan et al. | 106/20 |
| 4,881,084 | 11/1989 | Kan et al. | 346/1.1 |
| 4,923,515 | 5/1990 | Koike et al. | 106/20 |
| 4,945,833 | 8/1990 | Arahara et al. | 101/450.1 |
| 4,962,389 | 10/1990 | Kan et al. | 346/140 R |
| 4,986,850 | 1/1991 | Iwata et al. | 106/25 |
| 5,017,233 | 5/1991 | Kobayashi et al. | 106/20 |

FOREIGN PATENT DOCUMENTS

| | | |
|---|---|---|
| 0314189 | 5/1989 | European Pat. Off. . |
| 0326115 | 8/1989 | European Pat. Off. . |
| 0336238 | 10/1989 | European Pat. Off. . |

OTHER PUBLICATIONS

Patent Abstracts of Japan, vol. 13, No. 352 (E-801) with respect to Japanese Patent Document No. 1112667 (May 1, 1989), Aug. 8, 1989.

*Primary Examiner*—Mark L. Bell
*Assistant Examiner*—Helene Klemanski
*Attorney, Agent, or Firm*—Fitzpatrick, Cella, Harper & Scinto

[57] ABSTRACT

A recording material (ink) showing a selective adhesiveness to one of a pair of electrodes applying a voltage to the recording material, is constituted by dissolving an electrolyte in a solvent. The recording material is provided with an improved stability against environmental changes, particularly against a humidity change, if the solvent is at least partly constituted by a reaction product between a ring-opening product of an alkylene oxide $(R-O)_{\overline{n}}$ and glycerin or phenol, wherein R is an alkylene group and n is an integer.

9 Claims, 3 Drawing Sheets

RECORDING MATERIAL

FIELD OF THE INVENTION AND RELATED ART

The present invention relates to a recording material.

As peripheral equipment for recording used in conjunction with a computer, etc., there have been known various printers utilizing various recording systems, such as laser beam printers, ink-jet printers, thermal transfer printer, wire dot printer and daisy-wheel printers.

With respect to such a recording system, our research group has proposed a recording method wherein a pattern of adhesiveness is chemically imparted to a specific ink and recording is effected by utilizing the resultant difference between the adhesiveness and non-adhesiveness in the ink (U.S. Pat. No. 4,881,084).

This recording method comprises:

providing a fluid ink which is capable of forming a fluid layer, substantially non-adhesive and capable of being imparted with an adhesiveness on application of an energy, forming a layer of the fluid ink on an ink-carrying member, applying a pattern of the energy corresponding to a given image signal to the ink layer to form an adhesive pattern of the ink, and transferring the adhesive pattern of the ink to a transfer-receiving medium to form thereon an ink pattern corresponding to the energy pattern applied.

However, the above-mentioned recording method is not necessarily suitable for printing for mass-producing printed matter, in view of the printing cost, etc.

On the other hand, as the technique suitable for the mass-production printing, there have been known various printing processes such as planographic printing, letterpress printing, and gravure printing. However, in these conventional printing processes, the production of a printing plate requires complicated steps and the patterning of an ink requires dampening water, whereby the handling thereof is considerably troublesome. Further, because the adhesion property of the ink is easily affected by temperature or humidity, the above-mentioned printing processes lack in environmental stability. Accordingly, it is difficult to apply the conventional printing processes to the peripheral recording equipment used in conjunction with a computer, etc.

Our research group has also proposed some printing processes including one using a solid ink (European Laid-Open Patent Application EP-A 0314189), and one wherein an ink is supplied to a printing plate by changing the pH value in the ink (U.S. Pat. No. 4,945,833).

Further, our research group has proposed a printing process and a recording material wherein a voltage is applied to the recording material so as to change its adhesiveness, whereby a recording is effected (EP-A 0326115)

This printing process comprises the steps of:

providing a recording material capable of changing its adhesiveness corresponding to the polarity of a voltage applied thereto;

supplying the recording material between a pair of electrodes; and applying a voltage between the pair of electrodes thereby to attach the recording material to either one of the pair of electrodes.

Further, the recording material used for this printing process comprises a liquid dispersion medium and fine particles dispersed therein, at least a part of the fine particles comprising charged or chargeable fine particles.

Our research group has further improved the above-mentioned printing process and proposed a printing process wherein an ink remaining on the surface of a roller of a printing device is removed therefrom (EP-A 0336238).

The above-mentioned printing process which relies upon a change in adhesiveness or adhesivity of an ink by application of a voltage still requires improvement. Namely, in the printing process, the properties of the ink are gradually changed, particularly when the printing is continued for a long time. For instance, because of drying of the ink, the electrical resistivity or viscosity of the ink is gradually increased Accordingly, our research group has proposed an image-forming method and an image forming apparatus wherein some ink components are supplied so as to prevent the change in physical property of the ink due to gradual decrease of such ink components (U.S. patent Ser. No. 507,471).

Still another problem of the above-mentioned printing process is that the ink absorbs moisture in the air to have a lower viscosity when used for a long time in an environment of a high humidity, e.g., 95%.

SUMMARY OF THE INVENTION

The present invention aims at an improvement in a recording material or ink as used in the above-described printing process wherein the adhesiveness of the ink is changed by application of a voltage to effect a printing.

A more specific object of the present invention is to provide a recording material or ink free from a decrease in viscosity due to moisture absorption or an increase in viscosity due to drying.

According to the present invention, there is provided a recording material comprising at least a solvent and an electrolyte and showing a change in adhesiveness when placed between a pair of electrodes under voltage application to adhere substantially selectively to one of the electrodes, wherein said solvent comprises a reaction product between a ring-opening product of an alkylene oxide $-R-O)_n$ and glycerin or phenol, wherein R is an alkylene group and n is an integer.

These and other objects, features and advantages of the present invention will become more apparent upon a consideration of the following description of the preferred embodiments of the present invention taken in conjunction with the accompanying drawings.

DETAILED DESCRIPTION OF THE INVENTION

Figure 1:
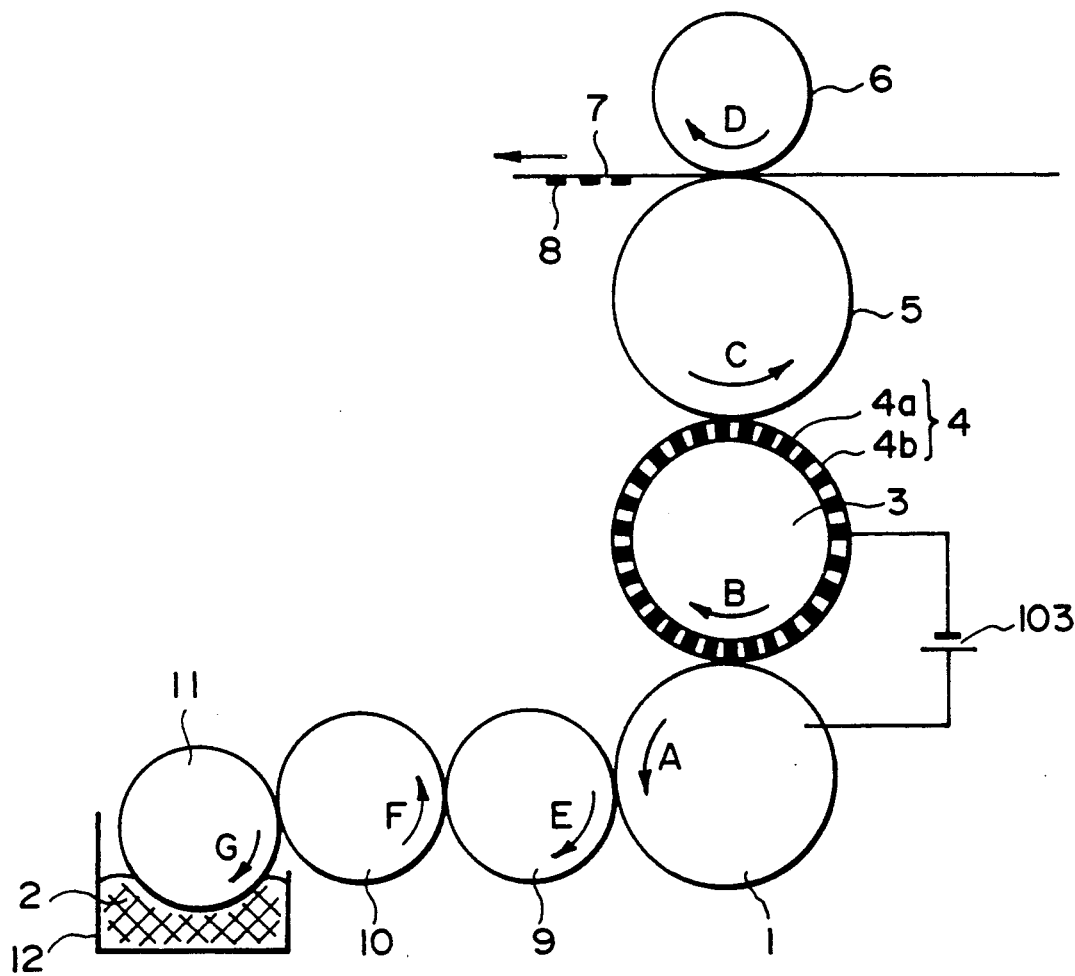
FIG. 1 is a schematic side sectional view of an apparatus for practicing image formation by using the ink according to the present invention.

The recording material (ink) of the present invention comprises at least a solvent and an electrolyte and causes a change in adhesiveness under application of a voltage. More specifically, when the ink according to the present invention is placed between a pair of electrodes and supplied with a voltage, the ink substantially adheres to only one of the electrodes and does not adhere to the other.

The mechanism under which the ink according to the invention causes a change of adhesiveness→non-adhesiveness may be considered as follows.

Due to current conduction under the voltage application, the ink is electrolyzed to generate a gas, thus changing its adhesiveness. In this case, the ink is formulated to originally have an adhesiveness and generate a gas in the vicinity of one electrode under voltage application so that the ink does not adhere to the electrode because of the generated gas. So as to provide the ink with a gas-generatability, an electrolyte is dissolved in a solvent to form the ink.

According to the present invention, the solvent constituting the ink of the invention comprises a reaction product between a ring-opening product of an alkylene oxide $-(R-O)_n$ and a glycerin or a phenol (hereinafter sometimes simply referred to as "reaction product"), wherein n is an integer and R is an alkylene group having preferably 2-10 carbon atoms, more preferably 2 or 3 carbon atoms. Thus, a ring-opening product of ethylene oxide and/or propylene oxide is preferred.

The reaction product between phenol and the ring-opening product of an alkylene oxide $-(R-O)_{\overline{n}}$ may be expressed as follows:

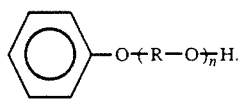

The reaction product between glycerin and the ring-opening product of an alkylene oxide may be obtained by a reaction similar to the one providing the above-mentioned reaction product between phenol and the ring-opening product of an alkylene oxide and the ring-opening product of an alkylene oxide may be reacted with all or a part of the three —OH groups in glycerin.

The reaction product thus obtained and used in the present invention is little hygroscopic and little vaporizable.

The reaction product may preferably have a weight-average molecular weight of $160-10^5$, further preferably $160-5 \times 10^4$. Herein, the weight-average molecular weight of below 1000 is based on a value measured by gas-chromatography, and the weight-average molecular weight of 1000 or above is based on a value measured by GPC (gel permeation chromatography).

As is understood from the molecular weight range, the ring-opening product of an alkylene oxide $-(R-O)_n$ giving the reaction product is generally in the form of a polyalkylene oxide which however can have a wide molecular weight range including an oligomer (n=2 or 3) or even a smaller average number in a sense that it can contain an alkylene oxide unit $-(R-O)_{\overline{n}}$ (n=1) at least partially. For this reason, the term "ring-opening product of an alkylene oxide" is used herein but the term "polyalkylene oxide" may be similarly used in a broad sense as described above. The reaction product used in the invention is formed by attaching phenol or glycerin to at least one end, of $-(R-O)_{\overline{n}}$.

The reaction product thus produced may preferably be contained in a proportion of 20-80 wt. parts, more preferably 30-70 wt. parts, per 100 wt. parts of the ink.

The reaction product can be used alone to constitute the solvent of the ink of the invention or may be mixed with another solvent to form a mixture solvent. Examples of such another solvent may include water, ethylene glycol, propylene glycol, diethylene glycol, triethylene glycol, tetraethylene glycol, polyethylene glycol (weight-average molecular weight: about 100-1000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide, dimethylformamide, dimethylsulfoxide, N-methyl-2-pyrrolidone, 1,3-dimethylimidazolidinone, N-methylacetamide, ethylene carbonate, acetamide, succinonitrile, sulfolane, furfuryl alcohol, N,N-dimethylformamide, 2-ethoxyethanol, hexamethylphosphoric triamide, 2-nitropropane, nitroethane, γ-butyrolacetone, propylene carbonate, 1,2,6-hexanetriol, dipropylene glycol, and hexylene glycol. These solvents may be used singly or in mixture of two or more species.

The solvent (including the reaction product) may preferably be used in a proportion of 40-90 wt. parts parts, per 100 wt. parts of the ink.

When the ink according to the invention is used to form an image, it is preferred that a gas is generated at one side electrode (preferably the cathode) and the gas generation is prevented or suppressed at the other side electrode (preferably the anode) so as to provide a large change in adhesiveness, and it is preferred to select the solvent in such a manner.

Examples of the electrolyte used in the ink may include: potassium iodide, sodium iodide, potassium thiocyanate, potassium bromide, sodium bromide, tetraethylammonium bromide, $LiBF_4$, $KPF_6$ and $NaClO_4$. These electrolytes may be used singly or in mixture of two or more species. The above-described electrolytes are not exhaustive, but any substances inclusive of electrolytes and ionic surfactants can be used as an electrolyte as far as they can be dissolved in the solvent to lower the electrical resistivity. Other examples of the electrolyte may include: alkylsulfuric acid salts, laurylsulfuric acid salts, higher alcohol sulfuric acid salts, succinic acid salts, carboxylic acid salts, polyethylene glycol ether sulfuric acid ester salts, amidosulfuric acid salts, disulfonic acid salts, polyoxyethylene lauryl ether sulfuric acid salts, polyoxyethylene alkyl ether acetic acid salts, alkylphosphoric acid salts, polyoxyethylene alkyl ether phosphoric acid salts, alkylammonium salts, alkylbenzylammonium salts, perfluoroalkylsulfonic acid salts, perfluoroalkylammonium salts, perfluoroalkylcarboxylic acid salts, polyoxyethylene-alkylphenyl ether sulfuric acid salts, alkanesulfonic acid salts, sulfuric acid ester salts, phosphoric acid ester, etc. Among these, $KPF_6$, $NaClO_4$ and $LiBF_4$ are particularly preferred since they do not provide harmful by-products on current conduction.

The electrolyte may preferably be contained in a proportion of 0.0001 mol per liter of the solvent to the saturation solubility, more preferably 0.005 mol/l to the saturation solubility. Below 0.0001 mol/l-solvent, the electrolyte does not show its effect and, above the saturation solubility, the ink becomes ununiform.

The recording material according to the present invention may further contain inorganic or organic fine particles. The fine particles contained in the recording material may improve the cutting property or separatability of the recording material so as to improve the resolution of the resultant image.

Examples of the fine particles to be contained in the recording material according to the present invention include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O_5$, mesobisilicic acid $H_4Si_3O_3$, and mesotetrasilicic acid $H_6Si_4O_{11}$; polyamide resin particles; polyamide-imide resin particles; iron hydroxide particles, aluminum hydroxide particles, fluorinated mica particles, polyethylene particles, motmorillonite particles, fluorine-containing resin particles; and other particles such as colloidal silica, fluorinated carbon (or carbon fluoride), titanium oxide, and carbon black.

Further, polymer particles containing various charge-controlling agents used as electrophotographic toners may be used for such a purpose.

In a preferred embodiment of the present invention, in view of the viscoelastic characteristic of the recording material, the entirety or a part of the fine particles may comprise swelling particles (i.e., particles capable of being swelled) which are capable of retaining the above-mentioned liquid dispersion medium therein. Examples of such swelling particles may include: organic bentonite, Na-montmorillonite, Ca-montmorillonite, 3-octahedral synthetic smectites, fluorinated mica such as Na-hectorite, Li-hectorite, Na-taeniolite, Na-tetrasilicic mica and Li-taeniolite; synthetic mica, silica, etc.

The above-mentioned fluorinated mica may be represented by the following general formula (1).

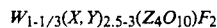

$$W_{1-1/3}(X, Y)_{2.5-3}(Z_4O_{10})F_2 \qquad (1),$$

wherein W denotes Na or Li; X and Y respectively denote an ion having a coordination number of 6, such as $Mg^{2+}$, $Fe^{2+}$, $Ni^2$, $Mn^{2+}$, $Al^{3+}$, and $Li^+$; Z denotes a positive ion having a coordination number of 4, such as $Al^{3+}$, $Si^{4+}$, $Ge^{4+}$, $Fe^{3+}$, $B^{3+}$, or a combination of these including, e.g., $(Al^{3+}/Si^{4+})$.

The above-mentioned organic bentonite is a complex of an organic ion and montmorillonite and can be obtained by exchange of an organic ion between bentonite and an organic compound, which may for example be trimethylmonoalkylammonium, dimethylbenzylalkylammonium, or dimethyldialkylammonium. The property of the organic bentonite largely depends on the montmorillonite, the principal constituent, examples of which may include Na-montmorillonite, Ca-montmorilonite, and 3-octahedral synthetic smectite.

The above-mentioned fine particles may generally have an average particle size of 100 microns or smaller, preferably 0.1-20 microns, more preferably 0.1-10 microns. In a case where the above-mentioned fine particles are contained in the recording material, the fine particles may generally be contained in the recording material in an amount of 1 wt % or more, preferably 3-90 wt. %, more preferably 5-60 wt. %.

The recording material according to the present invention may contain, as desired, a colorant comprising a dye or pigment generally used in the field of printing or recording, such as carbon black. When the recording material contains a colorant, the colorant content may preferably be 0.1-40 wt. %, more preferably 1-20 wt. %, based on the recording material. Instead of or in combination with the colorant, a color-forming compound capable of generating a color under voltage application can be contained in the recording material. The recording material may further contain a thickening agent (or viscosity improver), a viscosity-reducing agent, or a surfactant, etc. It is also possible to cause the above-mentioned fine particles per se to function as a colorant.

In the present invention, in order to control the viscosity of the ink, a polymer soluble in the above-mentioned solvent may be contained in an amount of 1-50 wt. %, particularly preferably 1-20 wt. % based on the ink. Examples of such polymer include: plant polymers, such as guar gum, locust bean gum, gum arabic, tragacanth, carrageenan, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyd resin, phenolic resin, epoxy resin, aminoalkyd resin, polyester resin, polyurethane resin, acrylic resin, polyamide resin, polyamide-imide resin, polyester-imide resin, and silicone resin; etc. These polymers may be used singly or in mixture of two or more species, as desired. Further, there can also be used grease such as silicone grease, and a liquid polymer such as polybutene.

In the present invention, the electric resistance of the ink may preferably be as low as possible. More specifically, the volume resistivity of the ink may preferably be $10^5$ ohm.cm or below. If the volume resistivity exceeds $10^5$ ohm.cm, the quantity of electric conduction becomes too small, or a high voltage is required in order to prevent a decrease in the quantity of electric conduction. The reaction product contained in the solvent according to the present invention has a function of preventing moisture absorption or evaporation of the ink without incurring an increase in resistivity of the ink.

A liquid such as alcohol showing a weak adhesion does not show an appropriate adhesiveness unlike the ink according to the invention. In this regard, the ink according to the present invention may preferably show a hardness of $10^1$-$10^6$ dyne/cm$^2$, more preferably $10^2$-$3\times10^5$ dyne/cm$^2$, at 25° C. The values are based on measurement by using a viscometer (Reoner RE-3305, available from K. K. Yamaden) according to the texture measurement method.

Further, the ink according to the invention may preferably show an adhesiveness such that, when it is placed in a thickness of 2 mm between a pair of platinum-plated stainless steel plates and the plates are separated from each other without voltage application, the respective plates show substantially same level of the ink adhesion, more specifically an area coverage ratio of 0.7–1.0 on the plates measuring 1 cm × 1 cm.

The ink according to the present invention may be obtained by mixing the solvent, the electrolyte, the fine particles and other optional components according to an ordinary method.

Next, an image forming method using the ink according to the present invention will be explained, with reference to accompanying drawings.

Referring to FIG. 1, an ink-carrying roller 1 is a cylindrical member rotating in the arrow A direction. The roller 1 may preferably comprise an electroconductive material such as aluminum, copper and stainless steel or a mixture of an electroconductive powder, such as that of carbon black, nickel and copper and a plastic material. Onto the cylindrical ink-carrying surface of the roller 1, an ink 2 as a recording material according to the present invention contained in an ink reservoir 12 is supplied by means of coating rollers 9 and 10 rotating in the directions of arrows E and F, respectively, to be formed into a layer having a uniform thickness. The amount of the ink supplied to the ink-carrying roller 1 may be adjusted by the number of the coating rollers. The coating rollers 9 and 10 are supplied with the ink 2 from the ink reservoir 12 through an ink roller 11. The ink roller 11 has a cylindrical shape and rotates in the arrow G direction to supply the ink from the ink reservoir 12. The ink roller 11 and the coating rollers 9 and 10 may preferably comprise an elastic material, such as rubber or plastics at least with respect to their surfaces.

The ink-carrying roller 1 is connected to one terminal of a DC power supply 103. A printing plate 4 wound about a plate roller 3 is disposed in contact with the ink layer on the ink-carrying roller. The printing plate 4 may for example comprise a substrate 4a comprising an electroconductive material such as metal, and a desired pattern 4b disposed thereon comprising an insulating material, e.g., as shown in FIG. 2.

Figure 2:
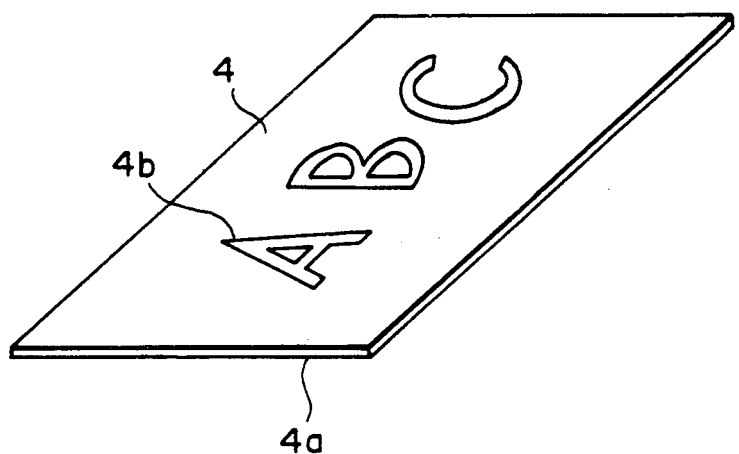
FIG. 2 is a schematic perspective showing an embodiment of the printing plate for use in the apparatus shown in FIG. 1.

Referring to FIG. 2, the material constituting the surface of the substrate 4a may include: metals such as aluminum, copper, stainless steel, platinum, gold, chromium, nickel, phosphor bronze, and carbon; electroconductive polymers; and dispersions obtained by dispersing metal filler, etc., in various polymers. The material constituting the pattern 4b may include: materials for thermal transfer recording (mainly, wax or resin), electrophotographic toner images; natural or synthetic polymers such as vinyl polymer.

Thus, when a voltage is applied between the plate 4 and the ink-carrying roller 1 by means of the power supply 103, the ink in contact with the electroconductive portion of the plate causes a change in adhesiveness to be selectively attached to the pattern 4b, thus forming an ink image based on the difference in adhesiveness. The voltage applied from the power supply 103 may practically be a DC voltage of 3–100 V, more preferably 5–50 V. When an AC bias voltage preferably of 10–100 V in the form of a high frequency (preferably of 10 Hz–100 KHz) is further applied, the image quality may be further improved in respect of sharpness.

Incidentally, while the printing plate 4 side is a cathode and the ink-carrying roller 1 side is an anode in FIG. 1, it is also possible that the printing plate 4 side is an anode and the ink-carrying roller 1 side is a cathode depending on the property or state of an ink used in combination therewith.

In the present invention, it is preferred that the voltage from the power supply 103 is applied between the rotation shafts of the plate roller 3 and the ink-carrying roller 1.

The thickness of the layer of the ink 2 formed on the ink-carrying roller 1 can vary depending on various factors including the gap between the ink-carrying roller 1 and the coating roller 9, the fluidity or viscosity of the ink 2, the surface material and surface roughness of the ink-carrying roller 1, and the rotational speed of the roller 1, but may preferably be about 0.001–10 mm as measured at an ink transfer position where the roller 1 is disposed opposite to the pattern plate 4 disposed on the plate roller 3.

If the layer thickness of the ink 2 is below 0.001 mm, it is difficult to form a uniform ink layer on the ink-carrying roller 1. On the other hand, if the ink layer thickness exceeds 10 mm, it becomes difficult to convey the ink 2 while keeping a uniform peripheral speed of the surface portion on the side contacting the printing plate 4 having the electroconductive pattern, and further it becomes difficult to pass a current between the electroconductive pattern plate 4 and the ink-carrying roller 1.

The thus formed ink pattern on the printing plate 4 is then transferred to a blanket cylinder 5, which rotates in the arrow C direction while contacting the printing plate 4 under pressure. Further, the ink pattern disposed on the blanket cylinder 5 is transferred to a recording medium (or a medium to be recorded) 7 such as a sheet of paper, cloth or metal, passing between the blanket cylinder 5 and an impression cylinder 6, which rotates in the arrow D direction while contacting the blanket cylinder 5, whereby an image 8 corresponding to the above-mentioned ink pattern is formed on the recording medium 7.

It is also possible that the ink pattern formed on the printing plate 4 is directly transferred to the recording medium 7 in some cases without providing the blanket cylinder 5. However, when the blanket cylinder 5 is provided, the printing plate 4 may be prevented from wearing or deterioration depending on the material constituting the blanket cylinder 5, and an image 8 having the same pattern as that of the printing plate 4 may be obtained on the recording medium 7.

In addition, the printing plate can be one comprising an electroconductive substrate and an insulating film disposed thereon wherein a conductivity pattern has been formed by electrical discharge destruction; or one comprising an electroconductive substrate and a photographic image disposed thereon having a conductive pattern of silver obtained by deposition of silver particles.

In the embodiment shown in FIG. 1, the printing plate 4 is wound about the cylindrical plate roller 3, but it is also possible to use the printing plate 4 in the form of a flat plate, as such, as an electrode, so that the ink according to the present invention applied onto the printing plate 4 is sandwiched between the plate 4 and an opposite electrode, and a voltage is applied to the ink in such a state, whereby an ink pattern is formed on the printing plate 4.

As described above, the ink according to the present invention may preferably be applied to an image forming process wherein the ink is supplied between an electrode (plate) having a prescribed insulating pattern and a counter electrode, and a voltage is applied between the pair of the electrodes to cause a change in adhesiveness of the ink, which is utilized for image formation.

Hereinbelow, the present invention will be explained based on Examples, wherein "parts" are by weight.

EXAMPLE 1

Ink formulation

| | |
|---|---|
| Reaction product between glycerin and polyethylene oxide ("Adeka Carpol TE-100", mfd. by Asahi Denka Kogyo K.K., Mw (weight-average molecular weight) = 300) | 40 parts |
| Lithium borofluoride | 3 parts |
| Fluorine-containing surfactant ("EF-105", mfd. by Shin-Akita Kasei K.K.) | 3 parts |
| Pigment ("Supranol Cyanine 7BF", mfd. by Bayer A.G.) | 4.4 parts |
| Bentonite-dimethyloctadecylammonium salt complex ("Organite T", mfd. by Houjun Yoko, K.K., Dav. (average particle size) = 10 microns) | 25 parts |
| Water | 10 parts |

Based on the above prescription, the fluorine-containing surfactant was first added to and dissolved in the reaction product between the glycerin and polyethylene oxide) in 1 hour by means of an ultrasonic vibrator, and into the resultant mixture, the other components were all added. The resultant mixture was further kneaded on a roll mill to obtain a blue amorphous colloid gel ink. The ink showed a volume resistivity of $3.0 \times 10^3$ ohm.cm and an ink hardness of $1.6 \times 10^5$ dyne/cm.

The above ink was applied in a thickness of about 2 mm on a platinum-plated stainless steel plate of 1 cm × 1 cm, and another platinum-plated stainless steel plate of the same size was applied on the ink. Then, the two platinum-plated stainless steel plates were separated from each other while the spacing therebetween was gradually increased under no voltage application. As a result, the ink adhered to both platinum-plated plates over almost the entire area.

Then, the ink was again sandwiched in a thickness of 2 mm between both platinum-plated stainless steel plates, one of which was connected to the cathode (grounded) and the other of which was connected to the anode. Then, the two platinum-plated plates were separated from each other while the spacing therebetween was gradually increased under application of a voltage of +30 volts, whereby all the ink adhered to the anode and no ink attached to the cathode.

Then, the ink was used for image formation (printing operation) by using the apparatus shown in FIG. 1.

The ink-carrying roller 1 was a 30 mm-dia. platinum-plated cylindrical roller of stainless steel (surface roughness: 1S), the printing plate roller 3 was a hard chromium-plated cylindrical roller of iron with a diameter of 30 mm, and the ink prepared above was placed in the ink reservoir 2.

Around the plate roller 3 was wound a plate 4 of a patterned vinyl resin. The ink 2 in the ink reservoir 12 was supplied to the ink-carrying roller 11 through the ink roller 11 and coating rollers 9 and 10. The ink carrying roller 1 was rotated in the arrow A direction at a peripheral speed of 100 mm/sec, and a silicone rubber-surfaced cylindrical coating roller 9 was rotated in the arrow E direction at a peripheral speed of 100 mm/sec while the gap between the rollers 1 and 9 was controlled to provide a 0.2 mm-thick ink layer on the ink-carrying roller 1. The plate roller 3 was rotated in the arrow B direction at a peripheral velocity of 100 mm/sec.

In the absence of voltage application, no image prints were obtained but, under application of a DC voltage of 30 volts between the plate roller 3 as the cathode and the ink carrying roller 1 as the anode, a large number of printed sheets 7 carrying clear images free from fog were obtained.

The apparatus including the ink reservoir 12 containing the ink was left standing for 4 hours in a high humidity environmental of 25° C. and 95% RH, and then the above printing operation was performed again, whereby similarly clear printed images were obtained.

Further, the apparatus including the ink reservoir 12 containing the ink was left standing for 4 hours in a low-humidity environment of 50° C. and 25% RH, and then the above printing operation was performed again, whereby similarly clear printed images were obtained.

EXAMPLE 2

Ink formation

| | |
|---|---|
| Reaction product between glycerin and polyethylene oxide ("Adeka Carpol TE-100", mfd. by Asahi Denka Kogyo K.K., Mw = 300) | 30 parts |
| Water | 7.5 parts |
| Lithium borofluoride | 4 parts |
| Pigment ("Supranol Cyanine 7BF", mfd. by Bayer A.G.) | 5.6 parts |
| Bentonite-benzyldimethylstearylammonium complex (Dav. = 10 microns) | 12 parts |

An ink according to the invention was prepared in a similar manner as in Example 1 based on the above prescription. The ink showed a volume resistivity of $3.4 \times 10^3$ ohm.cm and an ink hardness of $1.7 \times 10^5$ dyne/cm$^2$.

The ink was used in a printing operation in the same manner as in Example 1, whereby a large number of printed sheets carrying clear images were obtained.

The ink provided similarly good printed sheets even after standing of 4 hours in a high-humidity environment of 25° C. and 95% RH and in a low-humidity environment of 50° C. and 25% RH as a result of similar printing apparatus.

EXAMPLE 3

Ink formation

| | |
|---|---|
| Reaction product between glycerin and polyethylene oxide ("Adeka Carpol TE-100", mfd. by Asahi Denka Kogyo K.K., Mw = 300) | 30 parts |
| Water | 7.5 parts |
| Lithium borofluoride | 4 parts |
| Pigment ("Supranol Cyanine 7BF", mfd. by Bayer A.G.) | 5.6 parts |
| Bentonite-dimethyloctadecylammonium salt complex ("Organite T", mfd. by Houjun Yoko K.K., Dav. = 10 microns) | 12 parts |

An ink according to the invention was prepared in a similar manner as in Example 1 based on the above prescription. The ink showed a volume resistivity of $3.0 \times 10^3$ ohm.cm and an ink hardness of $2.0 \times 10^5$ dyne/cm$^2$.

The ink was used in a printing operation in the same manner as in Example 1, whereby a large number of printed sheets carrying clear images were obtained.

The ink provided similarly good printed sheets even after standing of 4 hours in a high-humidity environment of 25° C. and 95% RH and in a low-humidity environment of 50° C. and 25% RH as a result of similar printing apparatus.

EXAMPLE 4

Ink formation

| | |
|---|---|
| Reaction product between glycerin and polyethylene oxide ("Adeka Carpol TE-100", mfd. by Asahi Denka Kogyo K.K., Mw = 300) | 30 parts |
| Glycerin | 7.5 parts |
| Lithium borofluoride | 4 parts |
| Pigment ("Supranol cyanine 7BF", mfd. by Bayer A.G.) | 5.6 parts |
| Swelling mica (Lithium Taeniolite, mfd. by Topy Kogyo K.K., Dav. = 2.5 microns) | 16 parts |

An ink according to the invention was prepared in a similar manner as in Example 1 based on the above prescription. The ink showed a volume resistivity of $4.2 \times 10^3$ ohm.cm and an ink hardness of $1.6 \times 10^5$ dyne/cm$^2$.

The ink was used in a printing operation in the same manner as in Example 1, whereby a large number of printed sheets carrying clear images free from fog were obtained.

The ink provided similarly good printed sheets even after standing of 4 hours in a high-humidity environment of 25° C. and 95% RH and in a low-humidity environment of 50° C. and 25% RH as a result of similar printing apparatus.

EXAMPLE 5

Ink formulation

| | |
|---|---|
| Reaction product between phenol and polyethylene oxide ("Adeka Carpol KSA-120, mfd. by Asahi Denka Kogyo K.K.; 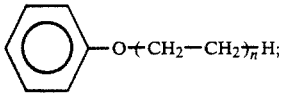 Mw = 225) | 35.4 parts |
| Silicon particles ("Tospearl 105", mfd. by Toshiba Silicone K.K., Dav. = 5 microns) | 35.4 parts |
| Reaction product between glycerin and propylene oxide/ethylene oxide polymer ("Adeka Carpol GH-10", mfd. by Asahi Denka Kogyo K.K.; Mw = 25,000) | 16.1 parts |
| KPF$_6$ | 3.9 parts |
| Carbon black ("Mogul L", Cabot Co., U.S.A) | 9.2 parts |

All the above components were mixed together and kneaded on a roll mill to prepare a black colloidal sol ink, which showed a volume resistivity of $7.0 \times 10^3$ ohm.cm and an ink hardness of $1.71 \times 10^4$ dyne/cm$^2$.

The above ink was applied in a thickness of about 2 mm on a platinum-plated stainless steel plate of 1 cm × 1 cm, and another platinum-plated stainless steel plate of the same size was applied on the ink. Then, the two platinum-plated stainless steel plates were separated from each other while the spacing therebetween was gradually increased under no voltage application. As a result, the ink adhered to both platinum-plated plates over almost the entire area.

Then, the ink was again sandwiched in a thickness of 2 mm between both platinum-plated stainless steel plates, one of which was connected to the cathode (grounded) and the other of which was connected to the anode. Then, the two platinum-plated plates were separated from each other while the spacing therebetween was gradually increased under application of a voltage of +30 volts, whereby all the ink adhered to the anode and no ink attached to the cathode.

The ink was used in a printing operation in the same manner as in Example 1, whereby a large number of printed sheets carrying clear images were obtained.

The ink provided similarly good printed sheets even after standing of 4 hours in a high-humidity environment of 25° C. and 95% RH and in a low-humidity environment of 50° C. and 25% RH as a result of similar printing apparatus.

EXAMPLE 6

Ink formulation

| | |
|---|---|
| Reaction product between phenol and polyethylene oxide ("Adeka Carpol KSA-120, Mw = 225) | 42.4 parts |
| Synthetic bentonite ("Sumecton SA", mfd. by Kunimine Kogyo K.K., Dav. = 1 microns) | 17.5 parts |
| Lithium borofluoride | 6.5 parts |
| Carbon black ("Stering R", Cabot Co., U.S.A.) | 10.5 parts |
| Reaction product between phenol and polypropylene oxide ("Adeka Carpol KSA-200", mfd. by Asahi Denka Kogyo K.K.; Mw = 165) | 10 parts |

An ink according to the invention was prepared in a similar manner as in Example 1 based on the above prescription. The ink showed a volume resistivity of $6.6 \times 10^3$ ohm.cm and an ink hardness of $4.39 \times 10^3$ dyne/cm$^2$.

The ink was used in a printing operation in the same manner as in Example 1, whereby a large number of printed sheets carrying clear images were obtained.

The ink provided similarly good printed sheets even after standing of 4 hours in a high-humidity environment of 25° C. and 95% RH and in a low-humidity environment of 50° C. and 25% RH as a result of similar printing apparatus.

COMPARATIVE EXAMPLE 1

Ink formulation

| | |
|---|---|
| Glycerin (showing an equilibrium moisture content of 55-60% at 25° C., 70% RH) | 80 parts |
| Water | 20 parts |
| Lithium borofluoride | 10 parts |
| Pigment ("Supranol Cyanine 7BF", mfd. by Bayer A.G.) | 10 parts |
| Hexaglycerin polyricinolate ("Hexaglyn PR-15", mfd. by Nikko Chemical K.K.) | 10 parts |
| Synthetic bentonite ("Sumecton SA", Dav. = 1 micron) | 24 parts |

A mixture according to the above prescription was kneaded on a roll mill to prepare a blue colloid gel ink.

The ink was used in a printing operation in the same manner by using the same apparatus as in Example 1 in the high humidity environment. As a result, after 10 minutes after the ink was placed in the ink reservoir 12, only poor printed sheets with increased fog were obtained.

COMPARATIVE EXAMPLE 2

Ink formulation

| | |
|---|---|
| Ethylene glycol (showing an equilibrium moisture content of 55-60% at 25° C., 70% RH) | 80 parts |
| Pigment ("Supranol Cyanine 7BF", mfd. by Bayer A.G.) | 10 parts |
| Hexaglycerin polyricinolate ("Hexaglyn PR-15", mfd. by Nikko Chemical K.K.) | 10 parts |
| Synthetic bentonite ("Sumecton SA", Dav. = 1 micron) | 51 parts |

A mixture according to the above prescription was kneaded on a roll mill to prepare a blue colloid gel ink.

The ink was used in a printing operation in the same manner by using the same apparatus as in Example 1 in the high humidity environment. As a result, after 10 minutes after the ink was placed in the ink reservoir 12, only poor printed sheets with increased fog were obtained.

COMPARATIVE EXAMPLE 3

Ink formulation

| | |
|---|---|
| Water | 50.5 parts |
| Fluorinated mica (lithium taneolite) ("Li-TN", mfd. by Topy Kogyo K.K.) | 48.3 parts |
| Dye ("Supranol Cyanine 7BF", mfd. by Bayer A.G.) | 1.2 parts |

An ink prepared according to the above prescription was applied in a thickness of about 2 mm on a platinum-plated stainless steel plate of 1 cm × 1 cm, and another platinum-plated stainless steel plate of the same size was applied on the ink. Then, the two platinum-plated stainless steel plates were separated from each other while the spacing therebetween was gradually increased under no voltage application. As a result, the ink adhered to both platinum-plated plates over almost the entire area.

Then, the ink was again sandwiched in a thickness of 2 mm between both platinum-plated stainless steel plates, one of which was connected to the cathode (grounded) and the other of which was connected to the anode. Then, the two platinum-plated plates were separated from each other while the spacing therebetween was gradually increased under application of a voltage of +30 volts, whereby all the ink adhered to the anode and no ink attached to the cathode.

Then, the above ink was applied in a thickness of about 2 mm on a first platinum-plated stainless steel plate of 1 cm × 1 cm and left to stand for 1 hour in a low-humidity environment of 50° C. and 25% RH, whereby the ink lost its adhesiveness.

On the ink thus having lost adhesiveness, a second platinum-plated stainless steel plate of the same size was applied, then a voltage of 30 V was applied between the two plates as the first plate as the cathode and the second plate as the anode, and under application of the voltage, the two plates were separated from each other, whereas no ink transfer was observed.

The inks prepared in Examples 1, 5 and Comparative Example 1 were respectively subjected to the printing operation 1 in the same manner as in Example 1 in a high-humidity environment of 25° C. and 95% RH, and the increase in ground fog density (i.e., staining of non-image part on the recording medium 7) was observed with lapse of the printing time. The ground fog density was measured by using "Screen DM-800" available from Dai-Nippon Screen K.K. The results are inclusively shown in FIG. 3.

Figure 3:
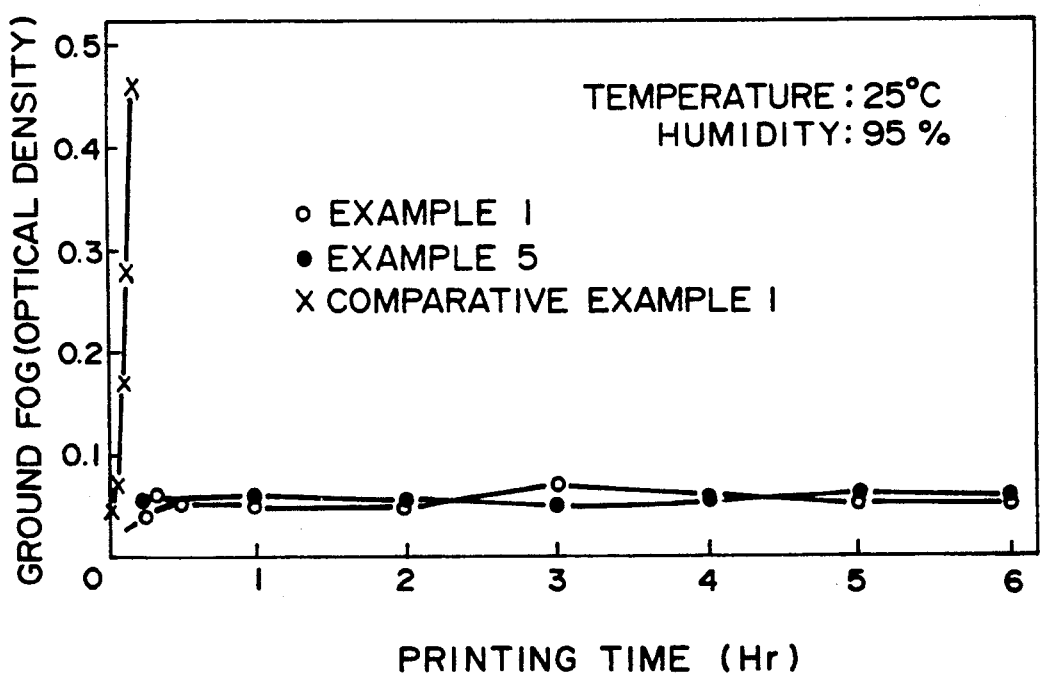
FIG. 3 is a graph showing a relationship between a printing time and a ground fog density when a printing was performed in a high-humidity environment.

As is understood from FIG. 3, the ink of Comparative Example 1 showed a rapid increase in ground fog density due to moisture absorption in a short period, but the inks according to Examples 1 and 5 showed substantially no increase in ground fog, thus showing their excellent stability against moisture absorption.

Further, the inks according to Example 5, Comparative Example 1 and Comparative Example 3 each in an initial weight of 10 g were respectively placed in a cylinder of 60 cm in diameter and 20 cm in height and left standing in a high-humidity environment of 25° C., 90% RH and/or in a low-humidity environment of 50° C., 25% RH, and the changes in weight of the respective inks were measured with the time of standing. The results are shown in FIG. 4.

Figure 4:
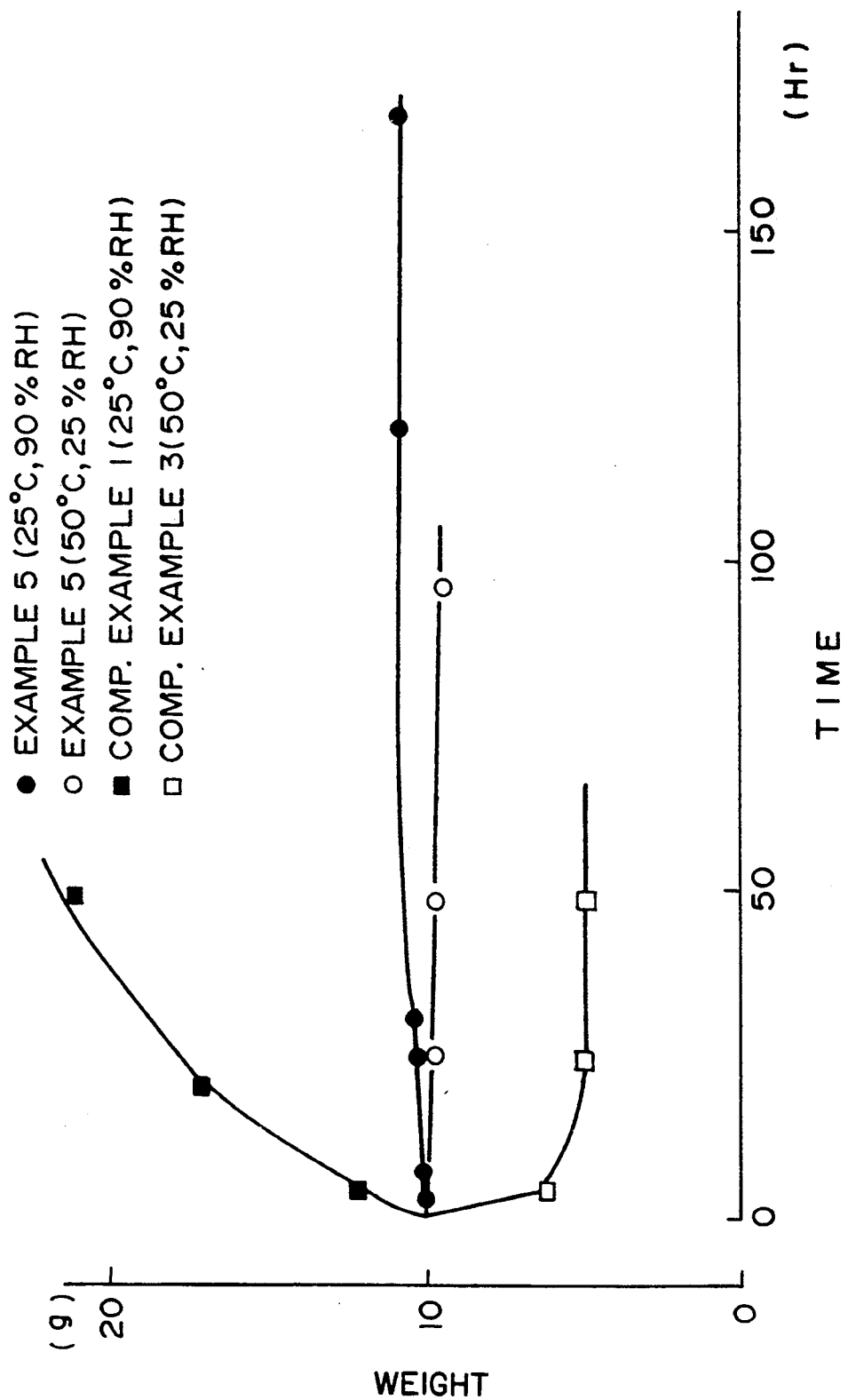
FIG. 4 is a graph showing a relationship between a change in weight of an ink and a standing time when the ink was left standing in a high-humidity environment and a low-humidity environment.

As is understood from FIG. 4, the ink according to Example 5 showed an excellent environmental stability being substantially unaffected by environmental humidity changes.

What is claimed is:

1. A recording material comprising at least a solvent and an electrolyte and showing a change in adhesiveness when placed between a pair of electrodes under voltage application to adhere substantially selectively to one of the electrodes, wherein said solvent comprises a reaction product between a ring-opening product of an alkylene oxide $-(R-O)_n$ and glycerin or phenol, wherein R is an alkylene group having 2-10 carbon atoms and n is an integer; wherein the reaction product is contained in a proportion of 20-80 wt. parts per 100 wt. parts of the recording material; and wherein the electrolyte is contained in a proportion of 0.0001 mol per liter of the solvent to the saturation solubility.

2. A recording material according to claim 1, wherein said alkylene oxide is ethylene oxide or propylene oxide.

3. A recording material according to claim 2, wherein said reaction product has a weight-average molecular weight of 160 to $10^5$.

4. A recording material according to claim 1, wherein said electrolyte is selected from the group consisting of $KPF_6$, $NaClO_4$ and $LiBF_4$.

5. A recording material according to claim 1, which further contains fine particles.

6. A recording material according to claim 5, wherein said fine particles comprise swelling particles.

7. A recording material according to claim 1, which shows a volume resistivity of $10^5$ ohm.cm or below.

8. A recording material according to claim 1, which shows a hardness of $10^1$-$10^6$ dyne/cm$^2$.

9. A recording material according to claim 5, wherein the solvent including the reaction product is contained in a proportion of 40-90 wt. parts, the fine particles are contained in a proportion of 3-90 wt. parts and a colorant is contained in a proportion of 0.1-40 wt. parts, respectively, per 100 wt. parts of the recording material.

* * * * *

UNITED STATES PATENT AND TRADEMARK OFFICE
CERTIFICATE OF CORRECTION

PATENT NO. : 5,143,546

DATED : September 1, 1992

INVENTOR(S) : Yuasa et al.

It is certified that error appears in the above-identified patent and that said Letters Patent is hereby corrected as shown below:

On the Title page, item
[30] Foreign Application Priority Data:

Insert: --Dec. 25, 1990 [JP] Japan ......... 2-412980--.

COLUMN 1:

Line 11, "printer," (both occurrences) should read --printers,--.

COLUMN 2:

Line 18, "increased" should read --increased.--; and
Line 47, "oxide--R--O)$_n$" should read --oxide $(R-O)_{\overline{n}}$--.

COLUMN 3:

Line 26, "oxide $(R-O)_n$" should read --oxide $(R-O)_{\overline{n}}$--;
Line 33, "oxide $(R-O)_{\overline{n}}$" should read --oxide $(R-O)_{\overline{n}}$--;
Line 61, "$(R-O)_n$" should read -- $(R-O)_{\overline{n}}$--; and
Line 65, "$(R-O)_{\overline{n}}$" should read -- $(R-O)_{\overline{n}}$--.

COLUMN 4:

Line 3, "end," should read --end--; and "$(R-O)_{\overline{n}}$." should read -- $(R-O)_{\overline{n}}$.--; and
Line 32, "parts," should be deleted.

UNITED STATES PATENT AND TRADEMARK OFFICE
CERTIFICATE OF CORRECTION

PATENT NO. : 5,143,546

DATED : September 1, 1992

INVENTOR(S) : Yuasa et al.

It is certified that error appears in the above-identified patent and that said Letters Patent is hereby corrected as shown below:

COLUMN 5:

Line 23, "mot-" should read -- mont- --; and
  Line 63, "rilonite," should read --rillonite,--.

COLUMN 6:

Line 35, "polyvinylpyrolidone," should
    read --polyvinylpyrrolidone,--.

COLUMN 9:

Line 29, "oxide)" should read --oxide--.

COLUMN 10:

Line 15, "environmental" should read --environment--.

Signed and Sealed this

Ninth Day of November, 1993

Attest:

BRUCE LEHMAN

Attesting Officer     Commissioner of Patents and Trademarks